(12) United States Patent
Katsuragawa (10) Patent No.: US 8,068,387 B2
(45) Date of Patent: Nov. 29, 2011

(54) MAGNETO-OPTICAL DEVICE

(75) Inventor: Tadao Katsuragawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 694 days.

(21) Appl. No.: 12/158,327

(22) PCT Filed: Dec. 27, 2006

(86) PCT No.: PCT/JP2006/326391
§ 371 (c)(1),
(2), (4) Date: Jun. 20, 2008

(87) PCT Pub. No.: WO2007/080816
PCT Pub. Date: Jul. 19, 2007

(65) Prior Publication Data
US 2009/0274016 A1   Nov. 5, 2009

(30) Foreign Application Priority Data

Jan. 10, 2006  (JP) .................................. 2006-002214
Oct. 27, 2006  (JP) .................................. 2006-292224

(51) Int. Cl.
*G11B 11/00* (2006.01)
(52) U.S. Cl. .................................................... 369/13.35
(58) Field of Classification Search ........................ None
See application file for complete search history.

(56) References Cited

U.S. PATENT DOCUMENTS

| | | | |
|---|---|---|---|
| 5,112,701 A | 5/1992 | Katsuragawa | |
| 6,055,215 A | 4/2000 | Katsuragawa | |
| 6,187,431 B1 | 2/2001 | Katsuragawa | |
| 6,243,193 B1 | 6/2001 | Katsuragawa | |
| 7,489,597 B2 * | 2/2009 | Miyanishi et al. | 369/13.33 |
| 2003/0053208 A1 * | 3/2003 | Hata et al. | 359/484 |
| 2005/0158988 A1 | 7/2005 | Lee et al. | |

FOREIGN PATENT DOCUMENTS

| | | |
|---|---|---|
| JP | 2003 168606 | 6/2003 |
| JP | 3458152 | 8/2003 |
| JP | 2004 219415 | 8/2004 |
| JP | 3628859 | 12/2004 |
| JP | 3654553 | 3/2005 |
| JP | 2005 142550 | 6/2005 |
| JP | 2005 221841 | 8/2005 |

OTHER PUBLICATIONS

Katsuragawa, T., "Enhancement of the Faraday Rotation", Jpn. J. Appl. Phys., vol. 40, No. 11, pp. 6365-6369 (2001).

* cited by examiner

*Primary Examiner* — Joseph Feild
*Assistant Examiner* — Henok Heyi
(74) *Attorney, Agent, or Firm* — Oblon, Spivak, McClelland, Maier & Neustadt, L.L.P.

(57) ABSTRACT

A magneto-optical device is disclosed that includes a non-magnetic support body and a fine particle arrangement layer on the non-magnetic support body. The fine particle arrangement layer includes multiple regularly arranged fine metal magnetic particles. In the magneto-optical device, magnetization is generated by applying an external magnetic field to the fine metal magnetic particles, and linearly polarized light is made incident on the fine metal magnetic particles, so that a magneto-optical effect is increased by the interaction between the incident light on the fine metal magnetic particles and the surface plasmon oscillation of the fine metal magnetic particles.

13 Claims, 5 Drawing Sheets

MAGNETO-OPTICAL DEVICE

TECHNICAL FIELD

The present invention relates generally to magneto-optical devices having a fine particle arrangement layer in which fine metal magnetic particles are regularly arranged.

BACKGROUND ART

Conventionally, studies have been made of surface plasmon oscillation and of the Faraday effect, and it has been discussed to use these for various magneto-optical devices.

First, a description is given of surface plasmon oscillation.

When metal crystals are reduced in size into ultra-fine particles, surface plasma oscillation, which is characteristic of ultra-fine particles, occurs.

Conduction electrons in metal form a kind of plasma state with ion shells (each of which is part of an atom except an outer electron), and oscillation due to the collective motion of these electrons is referred to as plasma oscillation. The quantum of this plasma oscillation (waves regarded as a quantum) is referred to as plasmon.

Surface plasmon refers to a plasma mode localized on a surface.

Here, fine particles are so sized as to cause surface plasmon oscillation, and are normally in the range of several nm to several tens of nm in size depending on the material.

Next, a description is given of the Faraday effect of a magnetic body (material) on a periodic structure.

The plane of polarization of light that passes through a transparent ferromagnetic body (material) rotates. This phenomenon is referred to as the Faraday effect. The Faraday rotation angle is maximized when the light travels in a direction parallel to a spin orientation in the magnetic material.

It has been confirmed that if a thin film of this magnetic material is not provided as a flat film but is provided on a periodically uneven structure, the Faraday rotation angle is substantially greater than in the case of a flat film. (See, for example, below-described Patent Documents 1 and 2.) It is presumed that this is because the refractive index differs between the S wave and P wave of the transmitted light because of the periodic structure so as to cause a great difference in the ratio of amplitude, thus increasing the Faraday rotation angle in combination with the Faraday effect, which causes the plane of polarization to rotate. (See, for example, below-described Non-Patent Document).

This method of providing a magnetic body (material) on a periodic structure has the following problems.

While various methods of reversing the magnetization of a magnetic body have been proposed, it is considered necessary as a specific method to provide a coil as immediately as possible below the film (in order to effectively apply a generated magnetic field to the magnetic body) and generate a magnetic field by causing current to flow through the coil.

In this case, a greater number of coil turns increases magnetic field strength, but increases the number of interconnection layers and manufacturing cost. Therefore, it is considered to increase current while reducing the number of coil turns. In this case, it is preferable to apply a transparent conductive film such as ITO as interconnection material in terms of high transmittance. Such a transparent conductive film, however, has a problem in that a large current cannot be caused to flow therein because of its resistance, which is approximately ten times that of a copper line. That is, practically, it is necessary to cause a current of several hundred mA to flow in order to obtain a magnetic field strength of 100 gausses in a pixel of 100 μm in diameter, for example. Therefore, it has been necessary to apply a low-resistance metal line (of copper, silver, gold, or the like) although it is an opaque material.

As the coil is reduced in diameter, the magnetic field strength at the coil center increases. However, it is not possible to have a high aperture ratio (that is, light transmittance) without reducing interconnection line width. For example, in the case of forming a circular coil of a period of 100 μm (with a 10 μm distance between coils), the aperture ratio is approximately 60% with a copper line width of 10 μm.

Accordingly, it has been considered an ideal and an object to be achieved to perform driving with a small current using a transparent conductive film of high transparency.

[Patent Document 1] Japanese Patent No. 3628859
[Patent Document 2] Japanese Patent No. 3654553
[Non-Patent Document] Katsuragawa, T; "Enhancement of the Faraday Rotation," Jpn. J. Appl. Phys., 40, 6365-636 (2001)

DISCLOSURE OF THE INVENTION

Embodiments of the present invention may solve or reduce one or more of the above-described problems.

According to one embodiment of the present invention, there is provided a magneto-optical device in which one or more of the above-described problems are solved or reduced.

According to one embodiment of the present invention, there is provided a magneto-optical device with increased permeability. More specifically, a magneto-optical device having its permeability increased by regularly arranging fine metal magnetic particles is provided, and the permeability of what has the function of generating a magnetic field is increased.

According to one embodiment of the present invention, there is provided a magneto-optical device suitable as a device for a high-definition display using the Faraday effect.

According to one embodiment of the present invention, there is provided a magneto-optical device that can perform magnetization with a smaller interconnection area even with a magnetic field generated from an interconnection simpler than a coil for magnetic field generation that has commonly been employed, such as a linear or curved interconnection, because less magnetic field strength is necessary for magnetization of a magnetic body, so as to be improved in light transmittance as a whole.

According to one embodiment of the present invention, there is provided a magneto-optical device that requires less magnetic field strength (that is, current value) for magnetization of a magnetic body so as to achieve improved light transmittance with an interconnection material such as high-resistance but transparent ITO without employing an opaque material such as copper, gold, or silver as a low-resistance interconnection material for magnetic field generation.

According to one embodiment of the present invention, in the case of applying a magneto-optical device that is thus improved in transmittance as a whole to a display, the background part (white image) is made brighter by increasing light transmittance and the black image part is made blacker (the Faraday rotation angle is increased) in order to make it possible to obtain a "high-contrast, high-definition image."

According to one embodiment of the present invention, there is provided a magneto-optical device including a non-magnetic support body and a fine particle arrangement layer on the non-magnetic support body, the fine particle arrangement layer including multiple regularly arranged fine metal magnetic particles, wherein magnetization is generated by applying an external magnetic field to the fine metal magnetic particles, and linearly polarized light is made incident on the fine metal magnetic particles, so that a magneto-optical effect is increased by an interaction between the incident light on the fine metal magnetic particles and a surface plasmon oscillation of the fine metal magnetic particles.

The external magnetic field may also be applied to the fine metal magnetic particles for magnetization before arrangement of the fine particles instead of after arrangement of the fine particles.

It is not necessary that all of the fine metal magnetic particles be magnetized, and there may be fine metal magnetic particles that are not magnetized. It is only that the Faraday effect does not increase at the unmagnetized part.

According to a magneto-optical device according to one embodiment of the present invention, fine metal magnetic particles are regularly arranged, so that the volume to be magnetized is reduced. Reduction in the volume to be magnetized does not degrade the function of rotating a plane of polarization. Accordingly, the current for magnetic field generation necessary for magnetization reversal can be significantly smaller than conventionally. Further, a linear (straight line) interconnection configuration may be applied for magnetic field generation instead of a winding configuration, so that it is possible to reduce the interconnection cross-sectional area of the device as a whole.

Further, it is also possible to easily reverse the magnetization direction of fine magnetic particles using a transparent conductive film (such as an ITO or ZnO film) without causing large current to flow using a metal interconnection. As a result, light blocking is reduced, so that transparency as a device is significantly increased. Further, application of this magneto-optical device to a display produces significant improvement in contrast.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

A description is given, with reference to the accompanying drawings, of an embodiment of the present invention.

Figure 1:
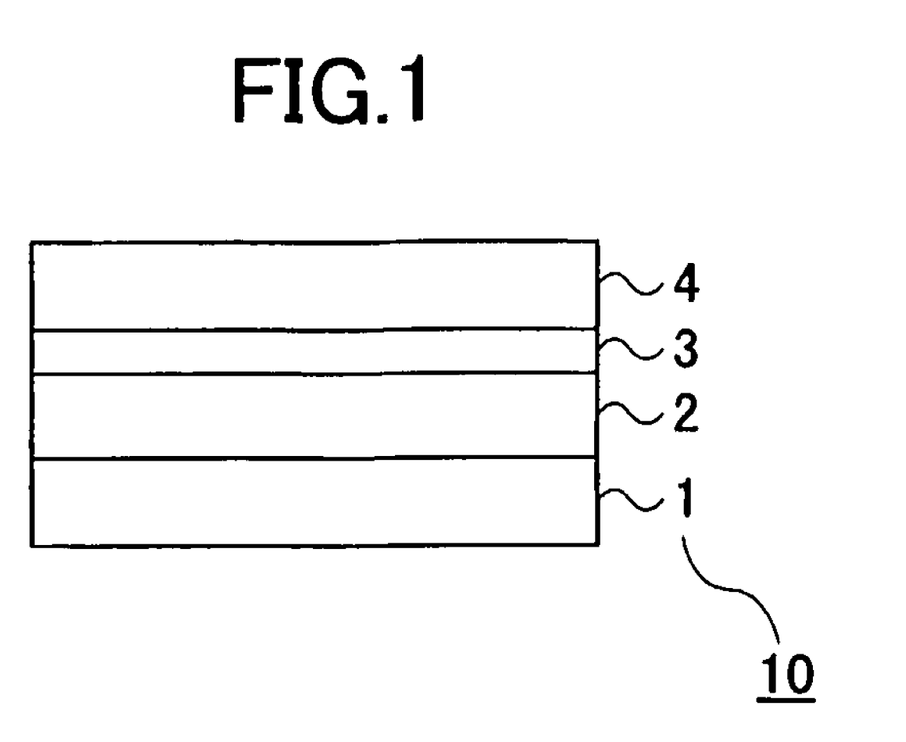
FIG. 1 is a schematic cross-sectional view of a magneto-optical device according to an embodiment of the present invention.

FIG. 1 is a schematic cross-sectional view of a magneto-optical device 10 according to the embodiment of the present invention.

The magneto-optical device 10 includes a predetermined non-magnetic support body 1, and an interconnection layer 2, a fine particle arrangement (array) layer 3, and a polarizer layer 4 that are formed in this order on the non-magnetic support body 1.

In this magneto-optical device 10, an external magnetic field is applied to the regularly arranged fine metal magnetic particles forming the fine particle arrangement layer 3 with a coil or a below-described conductive interconnection (line), thereby causing magnetization to be generated therein, and linearly polarized light is made incident thereon, so that a magneto-optical effect (increasing effect) due to the interaction between the incident light on the fine metal magnetic particles and the surface plasma oscillation of the metal is produced.

In this specification, "to regularly arrange" means to provide an arrangement with a certain rule. This "certain rule" means that the arrangement of fine metal magnetic particles has a period. Further, if the arrangement has linearity in addition to this regularity, it is easy to provide interconnections. The arrangement is not limited to a linear one as long as it has regularity. Accordingly, the arrangement may be a curved one.

Examples of the material of the non-magnetic support body 1 include refractory metals such as aluminum; transparent ceramic materials such as silica glass, GGG (gadolinium-gallium-garnet), sapphire, lithium tantalate, transparent glass ceramics, Pyrex (registered trademark) glass, single-crystal silicon, $Al_2O_3$, $Al_2O_3$.MgO, MgO.LiF, $Y_2O_3$.LiF, BeO, $ZrO_2$, $Y_2O_3$, and $ThO_2$.CaO; inorganic materials such as inorganic silicon; and plastic films. The support body 1 is non-magnetic so as not to affect magnetization of the fine metal magnetic particles. Therefore, according to this embodiment, the material of the non-magnetic support body 1 is not limited to those described above, and any material may be employed as long as it does not affect magnetization of the fine metal magnetic particles.

The interconnection layer 2, in which conductive interconnections are vertically and horizontally disposed, is provided near the fine particle arrangement layer 3 described below. The fine metal magnetic particles are magnetized using magnetic fields generated by energizing the interconnections. The magneto-optical effect is spatially changed by the direction of energization and the amount of energization.

The fine particle arrangement layer 3 has fine metal magnetic particles regularly arranged therein. Examples of the material of these fine particles include particles of iron, cobalt, or nickel (element); alloys of two or more of these materials; and alloys, mixtures and ultra-fine particles of complexes of these materials and other types of non-magnetic metals such as Au, Ag, and Pt. Further, two or more metals such as V, Cr, Mn, Cu, and Zn may be employed in combination. Furthermore, the above-described non-magnetic metals such as Ag, Ag, and Pt may be used with part of the atoms thereof being displaced by magnetic metal particles.

Further, the fine particle arrangement layer 3 may have a structure where a layer of fine metal magnetic particles is formed on a nucleus of an oxide magnetic body (material) or a layer of an oxide magnetic body (material) is formed on nuclei of fine metal magnetic particles.

The resonant wavelength can be changed using various organic or inorganic dielectrics so that the fine metal magnetic particles satisfy the conditions of surface plasmon oscillation with respect to light of a predetermined wavelength.

For example, the resonant wavelength can be changed by covering the fine metal magnetic particles with a high polymer or a dielectric film, substituting a non-magnetic element such as nitrogen or carbon for part of a metal element in the fine metal magnetic particles, or employing a mixture of a metal magnetic material and an organic or inorganic material as the fine metal magnetic particles.

Conventional known methods of arranging fine metal magnetic particles, such as those disclosed in Japanese Laid-Open Patent Application No. 2005-142550 (a method that uses a non-magnetic layer that does not cause ferromagnetic polarization), Japanese Laid-Open Patent Application No. 2003-168606 (a method that forms an organic coating film on the surface of each fine particle and arranges the fine particles), and Japanese Patent No. 3458152 (a method that uses the radiation pressure of a beam), may be applied to arrangement of the fine metal magnetic particles forming the fine particle arrangement layer 3. However, the method of arranging the fine metal magnetic particles forming the fine particle arrangement layer 3 according to this embodiment is not limited to those described above.

In addition to the above-described methods, not only chemical (solution) methods and self-organization methods but also known methods such as lithography, fine particle manipulation, forming fine holes and thereafter embedding fine particles in the holes, and charging nanoparticles in a gaseous phase and causing the nanoparticles to be adsorbed to and arranged on a substrate pattern charged with opposite polarity (sign) from the nanoparticles may be employed.

However, the present invention is not limited to those methods.

A conventionally known commercially-available polarizing film may be applied as a polarizer forming the polarizer layer 4.

Examples of the polarizing film include polyhalogen polarizing films, dye polarizing films, and metal polarizing films. However, the present invention is not limited to these polarizing films.

Further, the following polarizers may also be used.

(a) Polarizing Plate

The polarizing plate is formed by fixing a polarization layer including multiple rod elements, formed of fine ferromagnetic particles and arranged in a fixed direction, onto the surface of a substrate. The polarizing plate is easy to manufacture and has excellent optical properties.

(b) Wire Grid Polarizer

The wire grid polarizer is formed by providing gold or aluminum lines at fine intervals on a transparent substrate. In this case, letting the line interval (distance) and the wavelength be d and $\lambda$, respectively, the wire grid polarizer causes transmitted light to become substantially perfect linearly polarized light having a plane of vibration perpendicular to the lines if the light has a wavelength satisfying $\lambda \gg d$. The degree of polarization is said to be approximately 97%.

(c) Corning "Polarcor"

Polarcor is a glass material having elongated metal silver crystals arranged in one direction therein so as to have polarization properties. Unlike the conventional organic polarizing device, Polarcor is extremely resistant to heat, humidity, chemicals, and lasers. Polarcor is principally for infrared, but is also available in special preparation for visible light.

(d) Layered Polarizer

The layered polarizer is formed for visible light by alternatively stacking Ge (germanium) layers each of 6 to 8 nm in thickness and $SiO_2$ layers each of 1 μm in thickness by RF sputtering until the thickness is 60 μm. The figure of merit $\alpha_{TE}/\alpha_{TM}$ (the ratio of extinction coefficients of TE wave to TM wave) measured at a wavelength of 0.6 μm is close to 400, and the extinction ratio and the insertion loss measured at a wavelength of 0.8 μm are 35 dB and 0.18 dB, respectively, which are sufficient for visible light.

(e) Reflection Polarizer

Commercially available from Sumitomo 3M. Several hundred thin films having different refractive indexes are stacked in layers, and polarized light is extracted by repeated reflection and transmittance between layers.

The term "reflection" is used because the reflection polarizer reflects one and transmits the other of p-polarized light and s-polarized light. The total thickness is approximately 100 μm.

Since the reflection polarizer performs reflection, the image seems bright compared with the absorption type.

A wire grid-type reflection polarizer in which aluminum thin lines are periodically arranged is also available from Moxtek, a U.S. company.

(f) Polarization Beam Splitter

Optical devices that split a light beam into two or more beams or combine two or more beams into a single light beam are called beam splitters.

Of the beam splitters, those that split a light beam so that the two split light beams are different in the direction of polarization are called polarization beam splitters. Common polarization beam splitters have a coating of a dielectric multilayer film on the adhesion surface of two right-angle prisms so as to transmit a p-polarized component and reflect an s-polarized component at 90 degrees. Both transmittance and reflectance can be 98% or higher. Some polarization beam splitters employ a special grating.

(g) Polarizing Prism

A uniaxial crystal has different refractive indexes for an ordinary ray that vibrates perpendicularly to the directions of an optical axis and an extraordinary ray that has a direction of vibration in a principal plane containing the optical axis. Accordingly, it is possible to split lights having different planes of vibration by combining two prisms cut out from uniaxial crystals.

Examples of the polarizing prism include the Nicol prism, the Glan-Thompson prism, the Glan-Foucault prism, the Glan-Taylor prism, the Rochon prism, and the Wollaston prism.

(h) Diffraction Grating

Reducing the pitch of the diffraction grating makes its transmittance differ between a TE wave and a TM wave, so that the diffraction grating functions as a polarizer. The diffraction grating is not called a polarizer, but can be used as a polarizer because the diffraction grating has a polarizer function.

As the fine metal magnetic particles forming the fine particle arrangement layer 3 of the magneto-optical device 10, fine metal particles less than or equal to a visible light wavelength in size, such as fine particles of gold (Au), were arranged at a distance from each other. As a result, it has been confirmed that the ratio of amplitude of the S wave and P wave of transmitted linearly polarized light differs near the surface plasmon resonant frequency because of a strong electromagnetic field due to a surface plasmon.

Further, it has been confirmed that a change in the ratio of amplitude is caused by changing the distance between the two fine particles with respect to the resonant frequency of the localized surface plasmon of the fine metal magnetic particles.

Using fine particles of iron, which is a ferromagnetic material, as the fine metal magnetic particles causes the Faraday effect, or the rotation of a plane of polarization, in transmitted linearly polarized light.

It has been confirmed that this Faraday effect in combination with the above-described phenomenon of the amplitude ratio change is significantly greater than in the case of solely arranging ultra-fine particles in any manner.

This is because the electromagnetic field formed by the fine metal magnetic particles makes the refractive index different for an S wave and a P wave, thus causing a great difference in the ratio of amplitudes.

Unlike the Faraday effect of the conventional known entirely uniform magnetic film or periodic grating magnetic film, the Faraday effect of regularly arranged fine particles has the following characteristics.

Fine metal magnetic particles are characterized in that they can be magnetized with a magnetic field generated with a weak current because they are reduced in the volume that needs to be magnetized.

Accordingly, a transparent conductive film that cannot be used because of its high resistance in the case of applying the conventional magnetic film, such as an ITO film or ZnO film, can be used for the interconnection layer (that is, can be used in place of the conventional coil), and further, this interconnection can be made a thin line. Accordingly, in the case of applying this to a display, it is possible to significantly improve the entire transparency because (i) a transparent interconnection material can be used, (ii) the volume of the interconnection material can be reduced, (iii) the volume of the magnetic material layer having low transparency can be reduced, and so on.

The magneto-optical device according to the present invention is not limited to the example (magneto-optical device 10) shown in FIG. 1. For example, a predetermined reflecting layer may be provided on the side of the non-magnetic support body 1 opposite to the side on which the interconnection layer 2 is formed.

The reflecting layer may be formed by PVD. Examples of the material of the reflecting layer include Al, Cu, Ag, Au, Pt, Rh, $Al_2O_3$, $SnO_2$, TeC, SeAs, TiN, TaN, and CrN. Further, a dielectric multilayer film may also be applied as the reflecting layer.

Preferably, the thickness of the reflecting layer is within the range of 0.1 to 1 μm.

The interconnections forming the interconnection layer 2 require a far smaller magnetic field than the conventional technology because fine metal magnetic particles are employed in this embodiment. Accordingly, the element that generates a magnetic field may not be a coil (winding), and may be interconnections of line segments of straight lines. By thus providing interconnections of line segments, it is possible to reduce an interconnection cross-sectional area, so that it is possible to reduce the size of the entire magneto-optical device 10.

The direction of magnetization of the fine magnetic particles can also be reversed easily by using a transparent conductive film of $SnO_2$, $In_2O_3$, or ZnO as the interconnections in place of metal interconnections of Au, Ag, Al, or Pt used in the conventional technology.

Further, an organic transparent conductive material such as a BEDO-TTF complex having an ethylenedioxy group or a CT complex using a C60 derivative may also be applied.

Therefore, according to this embodiment, it is possible to achieve far greater transparency than in the case of using the conventional magnetic material continuous film or periodic grating magnetic film, and it is possible to realize extremely high contrast by applying the magneto-optical device 10 of this embodiment to a display.

The magneto-optical device of this embodiment is not only applicable to a display using the contrast of transmitted light, but also applicable to an optical isolator using the Faraday rotation angle and a so-called optical switch for communications using an optical switch function. That is, the magneto-optical device of this embodiment is also applicable to an optical switch that utilizes a change in transmittance between the case of causing current to flow in one direction in a magnetic coil and the case of causing current to flow in the opposite direction in the magnetic coil.

Further, the magneto-optical device of this embodiment may also be applied to a magnetic head, with a coil attached or separately provided, so as to form a head for a disk or tape magnetic recording medium.

Further, the magneto-optical device of this embodiment may also be applied to an automatic light control window that continuously changes light transmittance with current using an optical switch function.

Further, the magneto-optical device of this embodiment, in combination with a polarization conversion element, can realize various devices that use not only an S wave and P wave but also approximately 70% of light.

A description is given below of specific examples according to this embodiment of the present invention. The present invention, however, is not limited to the examples shown below.

FIRST EXAMPLE

Figure 2:
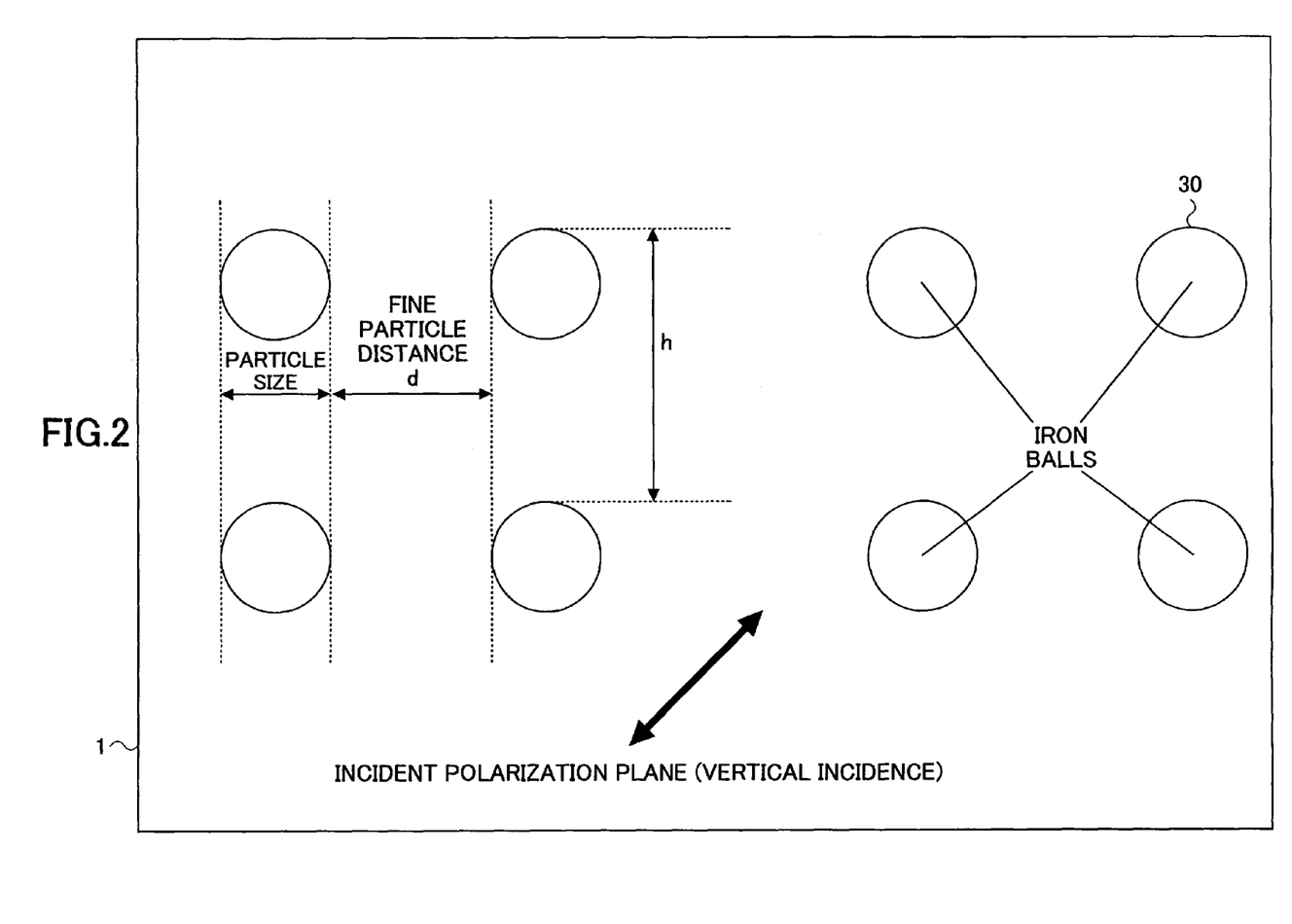
FIG. 2 is a schematic top plan view of an example of the magneto-optical device according to the embodiment of the present invention, showing a non-magnetic support body and the iron particles of a fine particle arrangement layer forming the magneto-optical device.

FIG. 2 is a schematic top plan view of a magneto-optical device of a first example according to the embodiment of the present invention, where ultra-fine iron particles 30, which are examples of the fine metal magnetic particles forming the fine particle arrangement layer 3, are regularly arranged on the non-magnetic support body 1. First, a silicon wafer is prepared as the non-magnetic support body 1, and is disposed within a scanning electron microscope. Then, an electron beam of 30 kV in acceleration voltage, $10^{-11}$ A in beam current, and approximately 5 nm in beam size (diameter) was emitted in a predetermined periodic pattern onto the surface of the non-magnetic support body 1, so that preferential adsorption sites were artificially formed with a regular arrangement on the surface of the non-magnetic support body 1. Here, a grating arrangement was employed as the regular arrangement. The term "preferential adsorption site" refers to the substantial center position of the below-described arrangement of fine metal magnetic particles.

Further, this magneto-optical device, which uses a silicon wafer, is used as a reflection type.

Next, the non-magnetic support body 1 was transferred to a vacuum evaporator, where iron was deposited on the non-magnetic support body 1 at a pressure of $10^{-6}$ Torr so as to be 4 nm in thickness.

Next, the non-magnetic support body 1 was heated so that the grating arrangement of the ultra-fine iron particles 30 (shown as iron balls in FIG. 2) each of a spherical shape of 30 nm with which surface plasmon oscillation is caused was formed. By thus heating the non-magnetic support body 1 on which iron is deposited, the ultra-fine iron particles 30 are disposed and formed at the position of the previously formed preferential adsorption site. As a result, the fine particle arrangement layer 3 formed of the ultra-fine iron particles 30 in a grating arrangement, which is an example of the regular arrangement, is obtained.

Linearly polarized light (of 550 nm wavelength) immediately after being transmitted through the polarizer was made incident on the grating arrangement of the ultra-fine iron particles 30 in a direction perpendicular to the plane of the paper, being inclined at 45° to the grating, as shown in FIG. 2.

The ratio of amplitude of the X component and Y component of an electric field measured with an ellipsometer after the incidence was 2.5 times that before the incidence. It is believed that this is due to a below-described increase in the Faraday effect, which is caused by the surface plasmon oscillation of the ultra-fine iron particles 30.

Next, an external magnetic field was applied using an electromagnet (coil), so that the ultra-fine iron particles 30 were magnetized in the fixed direction from the top to the bottom in the plane of the paper.

In this state, linearly polarized light was made incident the same as above, so that the plane of polarization rotated by 23°.

A greater Faraday rotation angle was obtained with the ultra-fine iron particles 30 according to this embodiment than a Faraday rotation angle (approximately 1.2°) with an iron thin film of the same thickness (30 nm).

In FIG. 2, a fine particle distance d is the distance between horizontally adjacent linear arrays of ultra-fine iron particles 30 in the plane of the paper, and a distance h is the distance between the centers of ultra-fine iron particles 30 vertically arranged in the plane of the paper. In FIG. 2, the distance h indicates the distance between the upper ends of ultra-fine iron particles 30, which is also the distance between the centers thereof.

SECOND EXAMPLE

Figure 3:
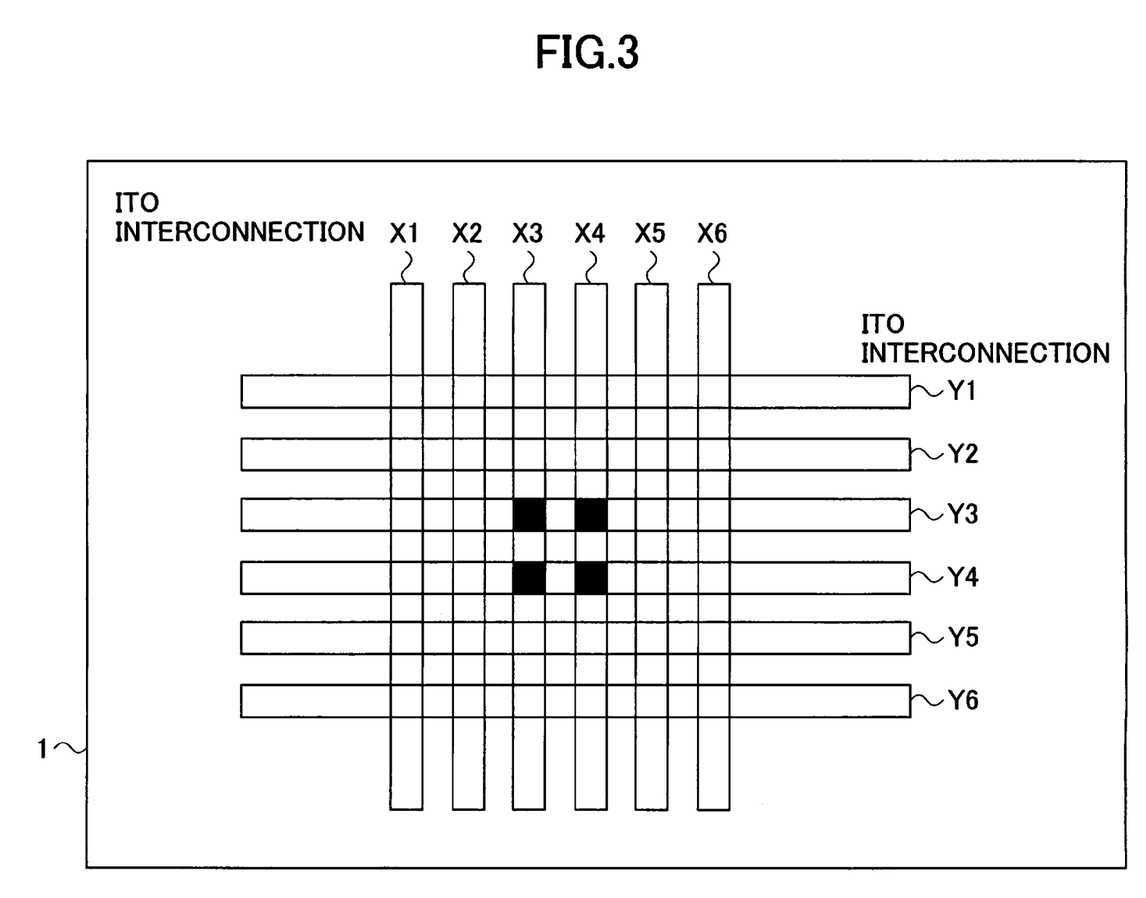
FIG. 3 is a schematic plan view of another example of the magneto-optical device according to the embodiment of the present invention, showing the non-magnetic support body and an interconnection layer.

As shown in FIG. 3, ITO films were formed in a grating-like manner with a width of 900 nm, a film thickness of 100 nm, and a distance (interval) of 900 nm on a silicon wafer serving as the non-magnetic support body 1, so as to serve as the interconnection layer 2.

An electron beam was emitted onto the intersections (so-called intersection points) of the grating of the interconnections formed of the ITO films the same as in First Example, thereby forming preferential adsorption sites on the non-magnetic support body 1. Then, the non-magnetic support body 1 having the interconnection layer 2 provided thereon was transferred to a vacuum evaporator, so that iron was deposited thereon at a pressure of $10^{-6}$ Torr so as to be 4 nm in film thickness. Next, the non-magnetic support body 1 was heated, so that fine metal magnetic particles of iron (iron balls 30 of FIG. 2) were provided on the intersections of the grating of the interconnection layer the same as in First Example, thereby forming the fine particle arrangement layer 3 in which the fine metal magnetic particles of iron were regularly arranged.

A hundred of the intersections of the interconnections formed of these ITO films were randomly selected, and a current of 70 mA was caused to flow through the interconnections of the selected intersections, thereby applying magnetic fields to the iron balls 30 serving as fine metal magnetic particles on the intersections.

FIG. 3 shows a case where the intersection points of ITO interconnections X3 and Y3, X3 and Y4, X4 and Y3, and X4 and Y4 are selected and current is caused to flow therethrough. (The selected intersection points are collectively referred to as "selected intersection group.) The intersection points through which current flows are indicated by black in FIG. 3. Thus, it is possible to apply magnetic fields only to the fine metal magnetic particles of iron arranged on the intersections indicated by black in FIG. 3.

It has been confirmed that in the case of causing linearly polarized light to be transmitted the same as in First Example, the Faraday rotation angle is extremely greater at the selected intersection group than at the other non-selected points.

THIRD EXAMPLE

A quartz substrate was employed in place of a silicon wafer as the non-magnetic support body 1. Using the quartz substrate makes the magneto-optical device a transmission type. With the other conditions being the same as in Second Example, the interconnection layer 2 employing ITO films and the fine particle arrangement layer 3 employing fine iron particles as fine metal magnetic particles were formed.

Figure 4:
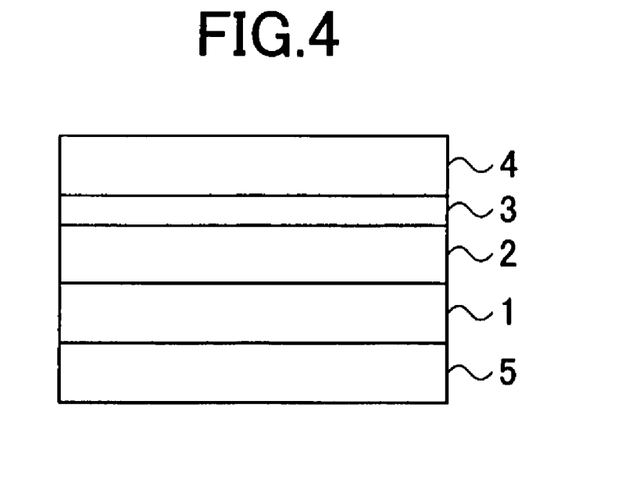
FIG. 4 is a schematic cross-sectional view of another example of the magneto-optical device according to the embodiment of the present invention.

As shown in FIG. 4, a polarizer layer 5 was formed on the bottom side (the side opposite to the interconnection layer 2) of the non-magnetic support body 1 so that the non-magnetic support body 1, the interconnection layer 2, and the fine particle arrangement layer 3 were sandwiched between the upper and lower polarizer layers 4 and 5. Both polarizer layers 4 and 5 were commercially available iodine-type polarizers.

When visible light was transmitted through the magneto-optical device of FIG. 4, magnetic fields were applied to the fine metal magnetic particles of iron of the group of intersections selected as intersection points through which current flows as indicated by black in FIG. 3. The light was blocked at the points of the selected intersections so that the points appeared black, while the light was transmitted at the other points, thereby producing high contrast.

FOURTH EXAMPLE

A reflecting layer 6 formed of an aluminum film of 300 nm in thickness was provided in place of the polarizer layer 5 shown in FIG. 4. With the other configurations being the same as in Third Example described below, a magneto-optical device having a configuration shown in FIG. 5 was formed.

Figure 5:
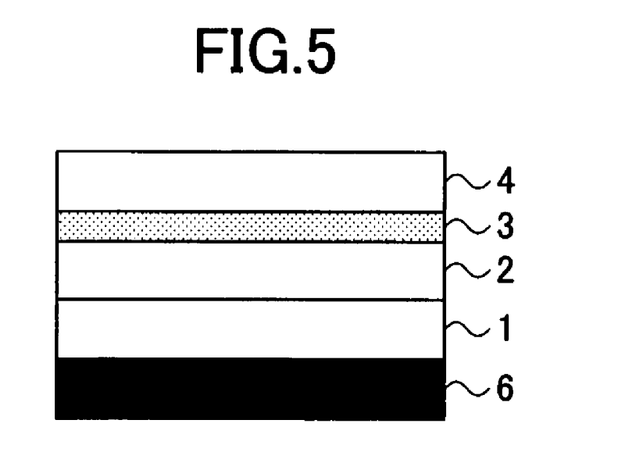
FIG. 5 is a schematic cross-sectional view of another example of the magneto-optical device according to the embodiment of the present invention.

When visible light was transmitted through the magneto-optical device of FIG. 5, magnetic fields were applied to the fine metal magnetic particles of iron of the group of intersections selected as intersection points through which current flows as indicated by black in FIG. 3. The light was blocked at the points of the selected intersections so that the points appeared black, while the light was transmitted at the other points, thereby producing high contrast.

FIFTH EXAMPLE

Preferential adsorption sites were artificially formed in advance with a grating arrangement on the silicon wafer of the non-magnetic support body 1. Using the vacuum evaporator applied in First Example, first, an iron film, and then a cobalt film, each of 3 nm in thickness, were successively formed in layers on the non-magnetic support body 1.

With the other conditions being the same as in First Example, the non-magnetic support body 1 having the above-described iron and cobalt films formed in layers thereon was heated, thereby forming the fine particle arrangement layer 3 in which spherical ultra-fine particles, which were fine metal magnetic particles formed of iron and cobalt, were arranged in a grating-like manner.

Then, the fine metal magnetic particles of iron and cobalt were magnetized by applying an external magnetic field thereto using an electromagnet, coil, or interconnection layer as described above the same as in First Example.

It was confirmed that the plane of polarization rotated by 13° when linearly polarized light was made incident the same as in First Example in this state.

SIXTH EXAMPLE

Preferential adsorption sites were artificially formed in advance with a grating arrangement on the silicon wafer of the non-magnetic support body 1 the same as in First Example. Using the vacuum evaporator applied in First Example, first, an iron film of 4 nm in thickness, and then a $SiO_2$ film of 13 nm in thickness, were successively formed in layers on the non-magnetic support body 1.

With the other conditions being the same as in First Example, the non-magnetic support body 1 having the above-described iron and $SiO_2$ films formed in layers thereon was heated, thereby forming the fine particle arrangement layer 3 in which spherical ultra-fine particles, which were fine metal magnetic particles formed of iron and $SiO_2$, were arranged in a grating-like manner.

Then, the fine metal magnetic particles of iron and $SiO_2$ were magnetized by applying an external magnetic field thereto using an electromagnet, coil, or interconnection layer as described above the same as in First Example.

It was confirmed that the plane of polarization rotated by 17° when linearly polarized light was made incident the same as in First Example in this state.

SEVENTH EXAMPLE

Preferential adsorption sites were artificially formed in advance with a grating arrangement on the silicon wafer of the non-magnetic support body 1. Using the vacuum evaporator applied in First Example, an iron film of 40 nm in thickness was formed on the non-magnetic support body 1. Then, the non-magnetic support body 1 having the iron film formed thereon was heated, thereby forming a first fine particle arrangement layer in which spherical ultra-fine particles, which were fine metal magnetic particles formed of iron, were arranged in a grating-like manner. Thereafter, a $TiO_2$ film of 11 nm in thickness was formed on the first fine particle arrangement layer. Then, preferential adsorption sites were artificially formed in advance with a grating arrangement on the $TiO_2$ film the same as on the silicon wafer of the non-magnetic support body 1, and a Au film of 8 nm in thickness was formed on the $TiO_2$ film having the preferential adsorption sites formed thereon. Then, the non-magnetic support body 1 having the Au film formed thereon was heated, thereby forming a second fine particle arrangement layer in which spherical ultra-fine particles, which were fine metal magnetic particles formed of Au, were arranged in a grating-like manner.

Thus, a magneto-optical device having an ultra-fine particle arrangement layer having a $Au/TiO_2/Fe$ layer structure was formed.

Then, the fine metal magnetic particles of Fe were magnetized by applying an external magnetic field thereto using an electromagnet, coil, or interconnection layer as described above the same as in First Example. It was confirmed that the plane of polarization rotated by 9° when linearly polarized light was made incident the same as in First Example in this state.

EIGHTH EXAMPLE

In forming an iron layer or the like on the non-magnetic support body 1 using the vacuum evaporator applied in First Example, wires were provided between the non-magnetic support body 1 and an evaporation source so as to vary the film thickness, thereby forming the fine particle arrangement layer 3 of a grating arrangement of spherical ultra-fine iron particles, which were fine metal magnetic particles formed at the time of the non-magnetic support body 1 so as to be different in particle size and 30 nm in average particle size. Observations of the ultra-fine iron particles forming this fine particle arrangement layer 3 with an electron microscope showed that the maximum particle size was 56 nm and the minimum particle size was 17 nm.

Then, the fine metal magnetic particles of iron were magnetized by applying an external magnetic field thereto using an electromagnet, coil, or interconnection layer as described above the same as in First Example.

It was confirmed that the plane of polarization rotated by 10° when linearly polarized light was made incident the same as in First Example in this state.

Further, it has been confirmed that the fine particle arrangement layer 3 of such fine metal magnetic particles having various particle sizes is able to obtain substantially the same rotation angle even if the range of emitted wavelength is extended.

NINTH EXAMPLE

An electron beam was emitted onto the non-magnetic support body 1 so that the fine particle distance d in FIG. 2 was to be substantially zero and fine particles were to be arranged on straight lines spaced at intervals of 400 nm, thereby forming preferential adsorption sites. Then, an iron film was formed on the non-magnetic support body 1, and the non-magnetic support body 1 was heated, thereby obtaining the fine particle arrangement layer 3 in which spherical ultra-fine particles, which were fine metal magnetic particles formed of iron, were arranged in a grating-like manner.

Then, the fine metal magnetic particles of iron were magnetized by applying an external magnetic field thereto using an electromagnet, coil, or interconnection layer as described above the same as in First Example.

It was confirmed that the plane of polarization rotated by 11° when linearly polarized light was made incident the same as in First Example in this state.

TENTH EXAMPLE

Figure 6:
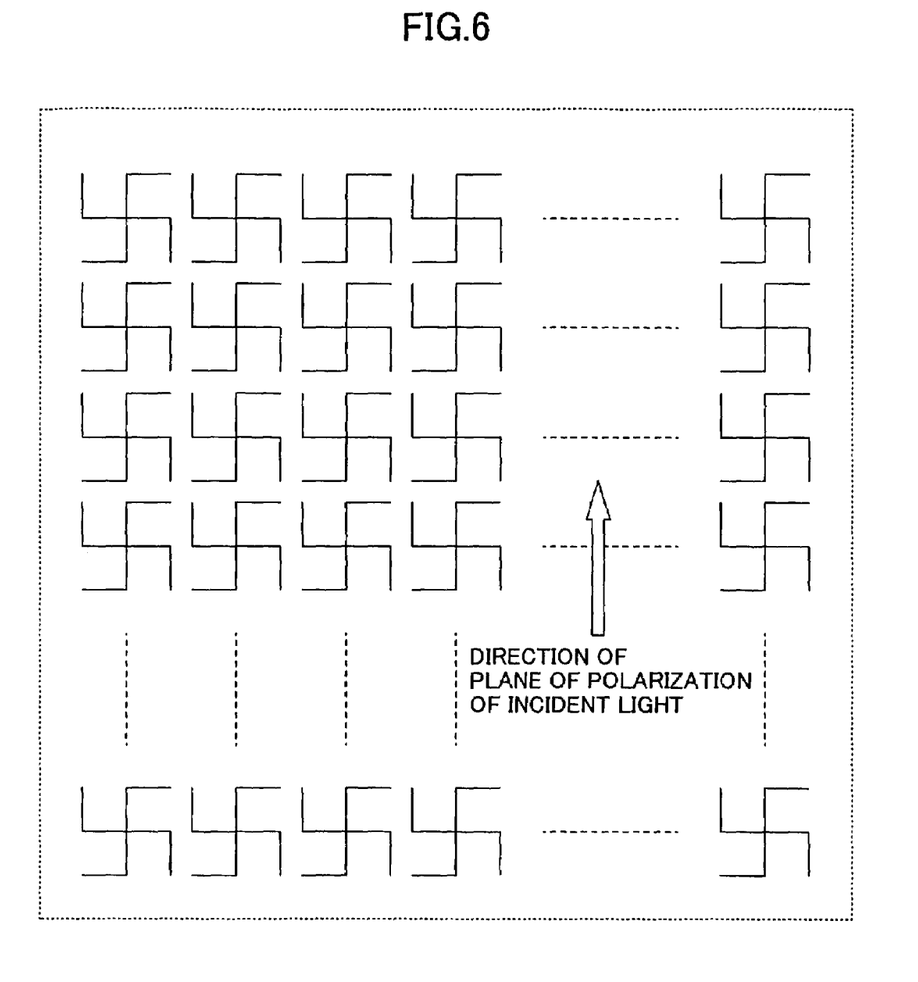
FIG. 6 is a schematic top plan view of another example of the magneto-optical device according to the embodiment of the present invention, showing the non-magnetic support body and the fine iron particles of the fine particle layer forming the magneto-optical device.

An electron beam was emitted onto the non-magnetic support body 1 so that the fine particle distance d in FIG. 2 was to be substantially zero and fine particles were to periodically form chiral patterns (mirror-asymmetric patterns) each of 500 nm square as shown in FIG. 6, thereby forming preferential adsorption sites. Then, an iron film was formed on the non-magnetic support body 1, and the non-magnetic support body 1 was heated, thereby obtaining the fine particle arrangement layer 3 in which spherical ultra-fine particles, which were fine metal magnetic particles formed of iron, were arranged in a grating-like manner.

Then, the fine metal magnetic particles of iron were magnetized by applying an external magnetic field thereto using an electromagnet, coil, or interconnection layer as described above the same as in First Example.

It was confirmed with a magneto-optical effect measuring device that the plane of polarization rotated by 15° when linearly polarized light was made incident the same as in First Example in this state. (However, the plane of polarization of the incident light was perpendicular to the plane of the paper as shown by arrow in FIG. 6).

The optical rotary power of the chiral patterns of the fine metal particles substantially continuously arranged and the Faraday rotation angle increased by the arrangement of the ferromagnetic metal particles were combined to be further enhanced, thus producing this result.

11th EXAMPLE

Preferential adsorption sites were artificially formed in advance with a grating arrangement (in periodic straight lines) on the silicon wafer of the non-magnetic support body 1. Using the vacuum evaporator applied in First Example, first, an iron film, and then a gold film, each of 3 nm in thickness, were successively formed in layers on the non-magnetic support body 1. With the other conditions being the same as in First Example, the silicon wafer (non-magnetic support body 1) having the above-described iron and gold films formed in layers thereon was heated, thereby forming the fine particle arrangement layer 3 in which spherical ultra-fine particles, which were fine metal magnetic particles formed of iron and gold, were arranged in a grating-like manner. Then, the fine metal magnetic particles of iron and gold were magnetized by applying an external magnetic field thereto using an electromagnet, coil, or interconnection layer as described above the same as in First Example.

It was confirmed that the plane of polarization rotated by 14° when linearly polarized light was made incident the same as in First Example.

It has been confirmed from experiments that a mixture ratio of gold to iron of 30 at % is effective to linearly polarized light of a 550 nm wavelength.

Thus, according to one embodiment of the present invention, there is provided a magneto-optical device including a non-magnetic support body and a fine particle arrangement layer on the non-magnetic support body, the fine particle arrangement layer including multiple regularly arranged fine metal magnetic particles, wherein magnetization is generated by applying an external magnetic field to the fine metal magnetic particles, and linearly polarized light is made incident on the fine metal magnetic particles, so that a magneto-optical effect is increased by the interaction between the incident light on the fine metal magnetic particles and the surface plasmon oscillation of the fine metal magnetic particles.

The external magnetic field may also be applied to the fine metal magnetic particles for magnetization before arrangement of the fine particles instead of after arrangement of the fine particles.

It is not necessary that all of the fine metal magnetic particles be magnetized, and there may be fine metal magnetic particles that are not magnetized. It is only that the Faraday effect does not increase at the unmagnetized part.

According to a magneto-optical device according to one embodiment of the present invention, fine metal magnetic particles are regularly arranged, so that the volume to be magnetized is reduced. Reduction in the volume to be magnetized does not degrade the function of rotating a plane of polarization. Accordingly, the current for magnetic field generation necessary for magnetization reversal can be significantly smaller than conventionally. Further, a linear (straight line) interconnection configuration may be applied for magnetic field generation instead of a winding configuration, so that it is possible to reduce the interconnection cross-sectional area of the device as a whole.

Further, it is also possible to easily reverse the magnetization direction of fine magnetic particles using a transparent conductive film (such as an ITO or ZnO film) without causing large current to flow using a metal interconnection. As a result, light blocking is reduced, so that transparency as a device is significantly increased. Further, application of this magneto-optical device to a display produces significant improvement in contrast.

The present invention is not limited to the specifically disclosed embodiment, and variations and modifications may be made without departing from the scope of the present invention.

The present application is based on Japanese Priority Patent Applications No. 2006-002214, filed on Jan. 10, 2006, and No. 2006-292224, filed on Oct. 27, 2006, the entire contents of which are hereby incorporated by reference.

The invention claimed is:

1. A magneto-optical device, comprising:
a non-magnetic support body;
an interconnection layer formed on the non-magnetic support body, the interconnection layer configured to magnetize fine metal magnetic particles using a magnetic field generated by energization of the interconnection layer and to spatially change a magneto-optical effect;
a fine particle arrangement layer formed on the interconnection layer, the fine particle arrangement layer including a plurality of regularly arranged fine metal magnetic particles; and
a polarizer layer formed on the fine particle arrangement layer,
wherein the fine metal magnetic particles are configured to be magnetized by an external magnetic field applied to the fine metal magnetic particles, the fine metal magnetic particles are configured to receive linearly polarized light made incident on the fine metal magnetic particles, and the fine metal magnetization particles are configured to have an increased magneto-optical effect by an interaction between the incident light on the fine metal magnetic particles and a surface plasmon oscillation of the fine metal magnetic particles.

2. The magneto-optical device as claimed in claim 1, further comprising:
one or more conductive interconnections provided in a first direction and a second direction perpendicular to each other near the fine particle arrangement layer including the fine metal magnetic particles,
wherein the fine metal magnetic particles are configured to be magnetized using a magnetic field generated by energizing the one or more conductive interconnections; and
the magneto-optical effect is spatially changed by a direction and an amount of the energization.

3. The magneto-optical device as claimed in claim 2, wherein the polarizer layer is one of a plurality of polarizer layers having a polarizer function, the polarizer layers being provided so that the fine particle arrangement layer including the fine metal magnetic particles and the conductive interconnections are provided between the polarizer layers.

4. The magneto-optical device as claimed in claim 2, further comprising:
a reflecting layer,
wherein the polarizer layer and the reflecting layer are provided so that the fine particle arrangement layer including the fine metal magnetic particles and the conductive interconnections are provided between the polarizer layer and the reflecting layer.

5. The magneto-optical device as claimed in claim 1, wherein the fine metal magnetic particles comprise a plurality of types of magnetic metals.

6. The magneto-optical device as claimed in claim 1, wherein the fine metal magnetic particles form a plurality of layers.

7. The magneto-optical device as claimed in claim 1, wherein the fine metal magnetic particles vary in diameter.

8. The magneto-optical device as claimed in claim 1, wherein the fine metal magnetic particles are arranged in straight lines with a period of 10 μm or less.

9. The magneto-optical device as claimed in claim 1, wherein the fine metal magnetic particles are arranged as mirror-asymmetric patterns.

10. The magneto-optical device as claimed in claim 1, wherein the fine particle arrangement layer further comprises fine non-magnetic metal particles in addition to the fine metal magnetic particles.

11. The magneto-optical device as claimed in claim 1, wherein the fine metal magnetic particles are covered with one of a high polymer and a dielectric film.

12. The magneto-optical device as claimed in claim 1, wherein a non-magnetic element is substituted for a part of a metal element in the fine metal magnetic particles.

13. The magneto-optical device as claimed in claim 12, wherein the non-magnetic element is one of nitrogen and carbon.

* * * * *